US011206162B2

(12) United States Patent
Maes et al.

(10) Patent No.: US 11,206,162 B2
(45) Date of Patent: Dec. 21, 2021

(54) METHOD AND APPARATUS FOR COORDINATING FDX AND TDD COMMUNICATIONS IN A COMMUNICATION SYSTEM

(71) Applicant: Nokia Technologies OY, Espoo (FI)

(72) Inventors: Jochen Maes, Antwerp (BE); Yannick Lefevre, Antwerp (BE); Werner Coomans, Antwerp (BE)

(73) Assignee: NOKIA TECHNOLOGIES OY, Espoo (FI)

( * ) Notice: Subject to any disclaimer, the term of this patent is extended or adjusted under 35 U.S.C. 154(b) by 90 days.

(21) Appl. No.: 16/643,785

(22) PCT Filed: Sep. 10, 2018

(86) PCT No.: PCT/EP2018/074255
§ 371 (c)(1),
(2) Date: Mar. 2, 2020

(87) PCT Pub. No.: WO2019/052934
PCT Pub. Date: Mar. 21, 2019

(65) Prior Publication Data

US 2020/0220704 A1 Jul. 9, 2020

(30) Foreign Application Priority Data

Sep. 18, 2017 (EP) .................................... 17191707

(51) Int. Cl.
*H04L 25/08* (2006.01)
*H04L 5/14* (2006.01)
*H04L 27/26* (2006.01)

(52) U.S. Cl.
CPC ............. *H04L 25/085* (2013.01); *H04L 5/14* (2013.01); *H04L 27/2607* (2013.01)

(58) Field of Classification Search
CPC ..................................................... H04L 25/085
See application file for complete search history.

(56) References Cited

U.S. PATENT DOCUMENTS 7,113,549 B1 9/2006 Isaksson et al.
2013/0294597 A1* 11/2013 Shi .......................... H04B 3/32
379/406.01

(Continued)

FOREIGN PATENT DOCUMENTS

EP 2019509 A1 1/2009
EP 3340519 A1 6/2018
WO WO-2017/011146 A1 1/2017

OTHER PUBLICATIONS

International Search Report PCT/ISA/210 for International Application No. PCT/EP2018/074255 dated Nov. 13, 2018.

(Continued)

*Primary Examiner* — Jason E Mattis
(74) *Attorney, Agent, or Firm* — Harness Dickey & Pierce, P.L.C.

(57) ABSTRACT

The method includes transmitting by a first remote communication unit an upstream symbol with a first structure onto a first communication line at a reference time point $t_{rf}$, wherein the reference time point $t_{rf}$ is determined based on a time of reception of a downstream symbol with the first structure $t_{FDX\_DS\_RX}$ and a first propagation delay over the first communication line $t_{PD1}$, as $t_{rf}=t_{FDX\_DS\_RX}-t_{PD1}$; transmitting by a second remote communication unit an upstream symbol with a second structure onto the second communication line at $t_{TDD\_US\_TX}=t_{rf}-t_{PD2}$ during a time interval assigned for upstream transmission on the second communication line, wherein $t_{PD2}$ is a second propagation delay over the second communication line, so that the upstream (Continued)

symbol with the second structure transmitted by the second remote communication unit arrives at the access node at the reference time point $t_{rf}$.

14 Claims, 3 Drawing Sheets

(56) References Cited

U.S. PATENT DOCUMENTS

| | | | | |
|---|---|---|---|---|
| 2014/0328423 | A1* | 11/2014 | Agee | H04W 24/02 375/267 |
| 2016/0191230 | A1 | 6/2016 | Shi et al. | |
| 2018/0294941 | A1* | 10/2018 | Chapman | H04B 3/32 |
| 2020/0266853 | A1* | 8/2020 | Strobel | H04B 1/38 |

OTHER PUBLICATIONS

Written Opinion of the International Searching Authority PCT/ISA/237 for International Application No. PCT/EP2018/074255 dated Nov. 13, 2018.

* cited by examiner

METHOD AND APPARATUS FOR COORDINATING FDX AND TDD COMMUNICATIONS IN A COMMUNICATION SYSTEM

CROSS-REFERENCE TO RELATED APPLICATIONS

This application is a national phase under 35 U.S.C. § 371 of PCT International Application No. PCT/EP2018/074255 which has an International filing date of Sep. 10, 2018, which claims priority to European Application No. 17191707.3, filed Sep. 18, 2017, the entire contents of each of which are hereby incorporated by reference.

FIELD OF THE INVENTION

The invention relates to communication technology, in particular to a method of coordinating communications in a communication system.

BACKGROUND

Discrete Multi-Tone (DMT) communication paradigm combined with full-duplex (FDX) transmission (all carriers are simultaneously used for both directions of communication) has proven to be particularly successful for achieving record-breaking transmission rates over copper medium, such as Unshielded Twisted Pairs (UTP) or TV broadcast coaxial cables.

FDX transmission can theoretically double the aggregate data rate compared to Time Division Duplexing (TDD), such as in use for G.fast, or Frequency Division Duplexing (FDD), such as in use for VDSL2.

In FDX, downstream (DS) and upstream (US) symbols are time aligned though a timing advance (TA) parameter. The aim is to synchronize DS and US in such a way that both ends of the line start a symbol at the same absolute time instance. In this way, the effects of the propagation delay (PD) are equalized between DS and US, and the cyclic extension (CE) can be minimized to be proportional to 1×PD+delay spread. Conceptually, the CE is split up in a cyclic prefix (CP) to accommodate delay spread, and a cyclic suffix (CS) to accommodate propagation delay.

In TDD, such as in G.fast standard, DS and US use distinct time slots. The full CE can be used to mitigate delay spread only (CE proportional to delay spread). The effect of propagation delay only demonstrates itself in requirements on the gap size between US and DS sub-frames.

For a coexistence of FDX and TDD in a communication system, the reach of the G.fast line would be severely impacted because part of the cyclic extension of the G.fast TDD line would be used to accommodate for the propagation delay in order to synchronize the NEXT (near end crosstalk) from the FDX lines and the desired signal from the TDD line.

Thus, an objective of the invention is to propose a synchronization scheme for a coexistence of FDX and TDD in a communication system without impacting the reach of the G.fast lines.

SUMMARY OF THE INVENTION

The object of the invention is achieved by the method and apparatus in the claims.

According to one aspect of the present invention, there is provided a method of coordinating communications in a communication system, the communication system comprising an access node, communicatively coupled to: a first set of remote communication units being configured to operate in a full duplex, FDX, mode via respective ones of a first set of communication lines, and a second set of remote communication units being configured to operate in a Time Division Duplex, TDD, mode via respective ones of a second set of communication lines; wherein symbols transmitted on a first communication line connecting a first remote communication unit belonging to the first set of remote communication units to the access node have a first structure which comprises a first cyclic prefix portion, a data portion and a first cyclic suffix portion, and wherein a cyclic extension comprising the first cyclic prefix portion and the first cyclic suffix portion has a predetermined duration; and symbols transmitted on a second communication line connecting a second remote communication unit belonging to the second set of remote communication units to the access node have a second structure which comprises a second cyclic prefix portion and a data portion, the second cyclic prefix portion having the predetermined duration, and the symbol with the first structure and the symbol with the second structure having same symbol duration $T_{symb}$; the method comprising: transmitting by the first remote communication unit an upstream symbol with the first structure onto the first communication line at a reference time point $t_{rf}$, wherein the reference time point $t_{rf}$ is determined based on a time of reception of a downstream symbol with the first structure $t_{FDX\_DS\_RX}$ and a first propagation delay over the first communication line $t_{PD1}$, as $t_{rf}=t_{FDX\_DS\_RX}-t_{PD1}$; transmitting by the second remote communication unit an upstream symbol with the second structure onto the second communication line at $t_{TDD\_US\_TX}=t_{rf}-t_{PD2}$ during a time interval assigned for upstream transmission on the second communication line, wherein $t_{PD2}$ is a second propagation delay over the second communication line.

In a preferred embodiment, the method further comprises: determining the first propagation delay $t_{PD1}$ and the second propagation delay $t_{PD2}$; sending the first propagation delay $t_{PD1}$ to the first remote communication unit.

In a preferred embodiment, a FDX frame comprising a first FDX sub-frame and a second FDX sub-frame, the first FDX sub-frame comprising a first number of symbols with the first structure, the second FDX sub-frame comprising a second number of symbols with the first structure; a TDD frame comprising a downstream sub-frame and an upstream sub-frame, the downstream sub-frame comprising the first number of symbols with the second structure, the upstream sub-frame comprising the second number of symbols with the second structure; the upstream sub-frame is transmitted before the second FDX sub-frame is transmitted by an amount of time equal to the second propagation delay $t_{PD2}$.

In a preferred embodiment, the first FDX sub-frame is a downstream priority sub-frame where precedence is given to downstream communications from the access node to the first set of remote communication units, and the second FDX sub-frame is an upstream priority sub-frame where precedence is given to upstream communications from the first set of remote communication units to the access node.

In a preferred embodiment, the method further comprises: determining a time gap $t_{g2\_TDD}$ applied at the access node separating an end of a downstream sub-frame transmitted onto the second communication line and a beginning of a subsequent upstream sub-frame received from the second communication line as a predetermined length; determining a time gap $t_{g1'\_FDX}$ applied at the first remote communication unit and the access node separating an end of a first FDX sub-frame received from the first communication line and a beginning of a second FDX sub-frame transmitted onto the first communication line as $t_{g1'\_FDX}=t_{g2\_TDD}-t_{PD1}$; determining a time gap $t_{g1'\_TDD}$ applied at the second remote communication unit separating an end of a downstream sub-frame received from the second communication line and a beginning of a subsequent upstream sub-frame transmitted onto the second communication line as $t_{g1'\_TDD}=t_{g2\_TDD}-2t_{PD2}$; applying the time gap $t_{g1'\_FDX}$ at the first remote communication unit and the access node, and applying the time gap $t_{g1'\_TDD}$ at the second remote communication unit.

In a preferred embodiment, the predetermined length is determined according to the symbol duration $T_{symb}$ and a time gap $t_{g1\_TDD}$ applied at the access node separating an end of the upstream frame received from the second communication line and a beginning of a subsequent downstream sub-frame transmitted onto the second communication line as $t_{g2\_TDD}=T_{symb}-t_{g1\_TDD}$.

In a preferred embodiment, the first communication line and the second communication line are in a same binder.

In a preferred embodiment, the predetermined duration is determined to accommodate a delay spread and a propagation delay of a communication line having a longest supported loop length.

In a preferred embodiment, the method further comprises: controlling the access node to transmit a symbol with the first structure to at least one remote communication unit belonging to the first set of remote communication units at the reference time point $t_{rf}$.

According to another aspect of the present invention, there is provided a communication controller for coordinating communications in a communication system, the communication system comprising an access node, communicatively coupled to: a first set of remote communication units being configured to operate in a full duplex, FDX, mode via respective ones of a first set of communication lines, and a second set of remote communication units being configured to operate in a Time Division Duplex, TDD, mode via respective ones of a second set of communication lines; wherein symbols transmitted on a first communication line connecting a first remote communication unit belonging to the first set of remote communication units to the access node have a first structure which comprises a first cyclic prefix portion, a data portion and a first cyclic suffix portion, and wherein a cyclic extension comprising the first cyclic prefix portion and the first cyclic suffix portion has a predetermined duration; and symbols transmitted on a second communication line connecting a second remote communication unit belonging to the second set of remote communication units to the access node have a second structure which comprises a second cyclic prefix portion and a data portion, the second cyclic prefix portion having the predetermined duration, and the symbol with the first structure and the symbol with the second structure having same symbol duration $T_{symb}$; the communication controller being configured: to control the first remote communication unit to transmit an upstream symbol with the first structure onto the first communication line at a reference time point $t_{rf}$, wherein the reference time point $t_{rf}$ is determined based on a time of reception of a downstream symbol with the first structure $t_{FDX\_DS\_RX}$ and a first propagation delay over the first communication line $t_{PD1}$, as $t_{rf}=t_{FDX\_DS\_RX}-t_{PD1}$; to control the second remote communication unit to transmit an upstream symbol with the second structure onto the second communication line at $t_{TDD\_US\_TX}=t_{rf}-t_{PD2}$ during a time interval assigned for upstream transmission on the second communication line, wherein $t_{PD2}$ is a second propagation delay over the second communication line.

According to another aspect of the present invention, there is provided an access node comprising a communication controller according to the present invention.

According to another aspect of the present invention, there is provided a communication system comprising an access node, communicatively coupled to: a first set of remote communication units being configured to operate in a full duplex, FDX, mode via respective ones of a first set of communication lines, and a second set of remote communication units being configured to operate in a Time Division Duplex, TDD, mode via respective ones of a second set of communication lines; wherein symbols transmitted on a first communication line connecting a first remote communication unit belonging to the first set of remote communication units to the access node have a first structure and comprises a first cyclic prefix portion, a data portion and a first cyclic suffix portion, and wherein a cyclic extension comprising the first cyclic prefix portion and the first cyclic suffix portion has a predetermined duration; and symbols transmitted on a second communication line connecting a second remote communication unit belonging to the second set of remote communication units to the access node have a second structure and comprises a second cyclic prefix portion and a data portion, the second cyclic prefix portion having the predetermined duration, and the symbol with the first structure and the symbol with the second structure having same symbol duration $T_{symb}$; wherein communications in the communication system are coordinated according to the present invention.

According to another aspect of the present invention, there is provided a customer Premises Equipment, CPE, characterized in that communications of the CPE are coordinated according to the present invention.

The solution in the present invention makes it possible to have a coexistence of FDX and TDD in a communication system without impacting the reach of the TDD lines.

BRIEF DESCRIPTION OF THE FIGURES

The features and advantages of the invention will be more completely understood by appreciating the following detailed description of preferred embodiments with reference to the figures, wherein.

Wherein same or similar reference numerals refer to same or similar parts or components.

DETAILED DESCRIPTION

Figure 1:
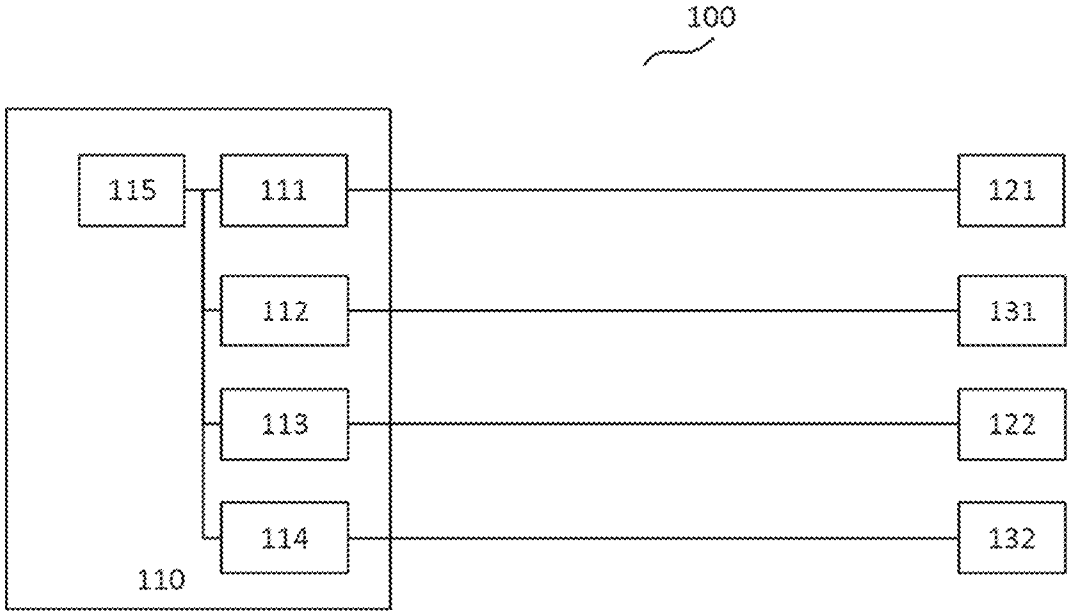
FIG. 1 depicts a schematic topology of a communication system according to an embodiment of the present invention.

Exemplary embodiments of the present application are described herein in detail and shown by way of example in the drawings. It should be understood that, although specific exemplary embodiments are discussed herein there is no intent to limit the scope of the invention to such embodiments. To the contrary, it should be understood that the exemplary embodiments discussed herein are for illustrative purposes, and that modified and alternative embodiments may be implemented without departing from the scope of the invention as defined in the claims. Similarly, specific structural and functional details disclosed herein are merely representative for purposes of describing the exemplary embodiments. The invention described herein, however, may be embodied in many alternate forms and should not be construed as limited to only the embodiments set forth herein.

FIG. 1 shows a schematic topology of a communication system according to an embodiment of the present invention.

As shown in FIG. 1, the communication system 100 comprises an access node 110, a first set of remote communication units 121, 122 and a second set of remote communication units 131, 132.

Specifically, the access node 110 may be implemented as a Distribution Point Unit operating according to G.fast legacy TDD and a new FDX communication technology to be deployed in co-existence with the legacy TDD G.fast communication technology. The access node 110 is typically deployed at a remote location closer to subscriber premises, in a street cabinet, on a pole, in the basement of a building, etc.

The first set of remote communication units 121, 122 are configured to operate in the FDX mode. The second set of remote communication units 131, 132 are configured to operate in the TDD mode.

In one embodiment, the access node 110 comprises a first set of communication units 111, 113 operating in the FDX mode connected through respective ones of a first set of communication lines to the first set of remote communication units 121, 122. The access node 110 further comprises a second set of communication units 112, 114 operating in the TDD mode connected through respective ones of a second set of communication lines to the second set of remote communication units 131, 132. The communication lines are typically copper Unshielded Twisted Pair (UTP).

In one embodiment, the access node 110 further comprises a communication controller 115 for coordinating communications in the communication system 100.

Specifically, in the following, embodiments of the invention will be described with respect to a first communication line and a second communication line. The first communication line connects two communication units operating in the FDX mode, i.e., a first remote communication unit 121 and a first communication unit 111 in the access node 110. The second communication line connects two communication units operating in the TDD mode, i.e., a second remote communication unit 131 and a second communication unit 112 in the access node 110. Advantageously, the first communication line and the second communication line are in the same binder.

Specifically, the communication units 111 and 112 at the access node, the first remote communication unit 121 and the second remote communication unit 131 individually comprise a transmitter (TX) and a receiver (RX). The first remote communication unit 121 and the second remote communication unit 131 may be implemented in a Customer Premises Equipment (CPE). By way of example, the CPE may be implemented as a G.fast gateway, a router, a bridge, or a Network Interface Card (NIC).

Figure 2:
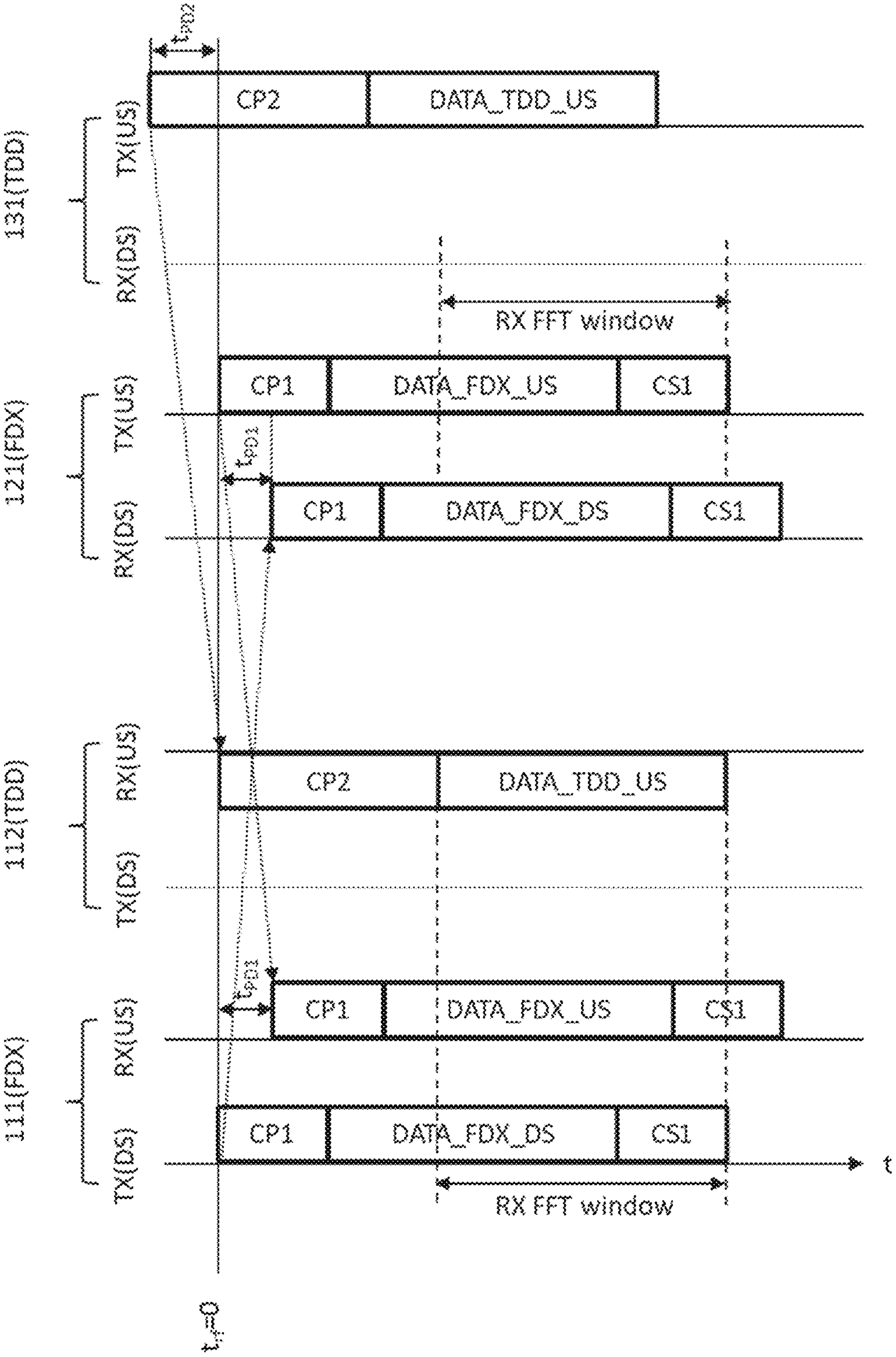
FIG. 2 depicts a schematic timing diagram of an embodiment of the present invention.

FIG. 2 shows a schematic timing diagram of an embodiment of the present invention.

As shown in FIG. 2, symbols transmitted on the first communication line in both directions, i.e., upstream direction (from the first remote communication unit 121 to the access node 110) and downstream direction (from the access node 110 to the first remote communication unit 121) have a first structure. A symbol with the first structure comprises a first cyclic prefix portion CP1, a data portion and a first cyclic suffix portion CS1, and wherein a cyclic extension CE comprising the first cyclic prefix portion CP1 and the first cyclic suffix portion CS1 has a predetermined duration $t_{CE}$.

Symbols transmitted on the second communication line in both directions, i.e., upstream direction (from the second remote communication unit 131 to the access node 110) and downstream direction (from the access node 110 to the second remote communication unit 131) have a second structure. A symbol with the second structure comprises a second cyclic prefix portion CP2 and a data portion, the second cyclic prefix portion CP2 having the predetermined duration $t_{CE}$.

Symbols with the second structure may further include a small cyclic suffix portion (not shown) for windowing purpose.

Besides, the symbol with the first structure and the symbol with the second structure have the same symbol duration $T_{symb}$. Therefore, the duration of the data portion in the symbol with the first structure equals the duration of the data portion in the symbol with the second structure.

In a preferred embodiment, the predetermined duration $t_{CE}$ is determined to accommodate a delay spread and a propagation delay of a communication line having a longest supported loop length. For a symbol with the first structure, the duration of the cyclic prefix portion CP1 is determined to accommodate the delay spread, and the duration of the cyclic suffix portion CS1 is determined to accommodate the propagation delay.

According to an embodiment of the present invention, the communication controller 115 is configured to control the first remote communication unit 121 and the access node 110 to transmit a symbol with the first structure onto the first communication line at the same absolute time, so as to equalize the effect of propagation delay between DS and US and to maximize the supported loop length.

Specifically, the communication controller 115 is configured to control the access node 110 to transmit a downstream symbol with the first structure (FDX_DS) to the first remote communication unit 121 at a reference time point $t_{rf}$, namely, $t_{FDX\_DS\_TX}=t_{rf}$. In the embodiment shown in FIG. 2, $t_{rf}=0$.

Accordingly, the FDX_DS symbol transmitted by the access node 110 arrives at the first remote communication unit 121 at $t_{FDX\_DS\_TX}=t_{rf}+t_{PD1}$, wherein, $t_{PD1}$ is a first propagation delay over the first communication line.

In one embodiment, the first remote communication unit 121 is synchronized with the access node 110 based on the time of reception of the FDX_DS symbol $t_{FDX\_DS\_RX}$ and the first propagation delay $t_{PD1}$. Therefore, the reference time $t_{rf}$ can be determined the first remote communication unit 121 as $t_{rf}=t_{FDX\_DS\_RX}-t_{PD1}$.

In one embodiment, the first propagation delay is determined by the access node 110 and transmitted to the first remote communication unit 121. Alternatively, the first propagation delay can be directly determined by the first remote communication unit 121.

After the reference time $t_{rf}$ is determined at the first remote communication unit 121, the first remote communication unit 121 transmits an upstream symbol with the first structure (FDX_US) onto the first communication line at the reference time point $t_{rf}$. The FDX_US symbol transmitted by the first remote communication unit 121 arrives at the access node 110 at $t_{FDX\_US\_RX}=t_{rf}+t_{PD1}$.

Furthermore, the communication controller 115 is configured to control the second remote communication unit 131 to transmit an upstream symbol with the second structure (TDD_US) onto the second communication line at $t_{TDD\_US\_TX}=t_{rf}-t_{PD2}$ during a time interval assigned for upstream transmission on the second communication line, wherein $t_{PD2}$ is a second propagation delay over the second communication line. As a result, the TDD_US symbol transmitted by the second remote communication unit 131 arrives at the access node 110 at the reference time point $t_{rf}$.

At the access node 110, a RX FFT window has a predetermined duration which equals the duration of the data portion of a symbol. As shown in FIG. 2, The RX FFT window begins at a time point when the data portion of the TDD_US symbol begins.

As $t_{PD1} \leq t_{CS1}$ and as the cyclic suffix portion CS1 also contains a cyclic extension of the data portion, it is possible to find a RX FFT window that does not include any symbol transition for the direct receive symbol and for the symbols received through interference (ECHO, NEXT, FEXT), while remaining away from the cyclic prefix portion CP1 and corresponding Inter Symbol Interference (ISI). In this way, mutual orthogonality between carriers is guaranteed. Typically, the RX FFT window is chosen to be as far as possible from the cyclic prefix portion CP1 as depicted in FIG. 2.

According to the present invention, it is possible to combine the FDX symbol structure comprising the first cyclic prefix portion and first cyclic suffix portion, which is necessary to realize FDX operation for the FDX lines, with a maximal cyclic prefix portion for the TDD symbols. This maximal cyclic prefix portion results in the maximal possible reach for the TDD lines for the given cyclic extension length.

In FIG. 2, the present invention is elaborated with respect to symbols. In operation, a plurality of symbols are transmitted consecutively in a sub-frame. In the following, the present invention will be described with respect to sub-frames.

Figure 3:
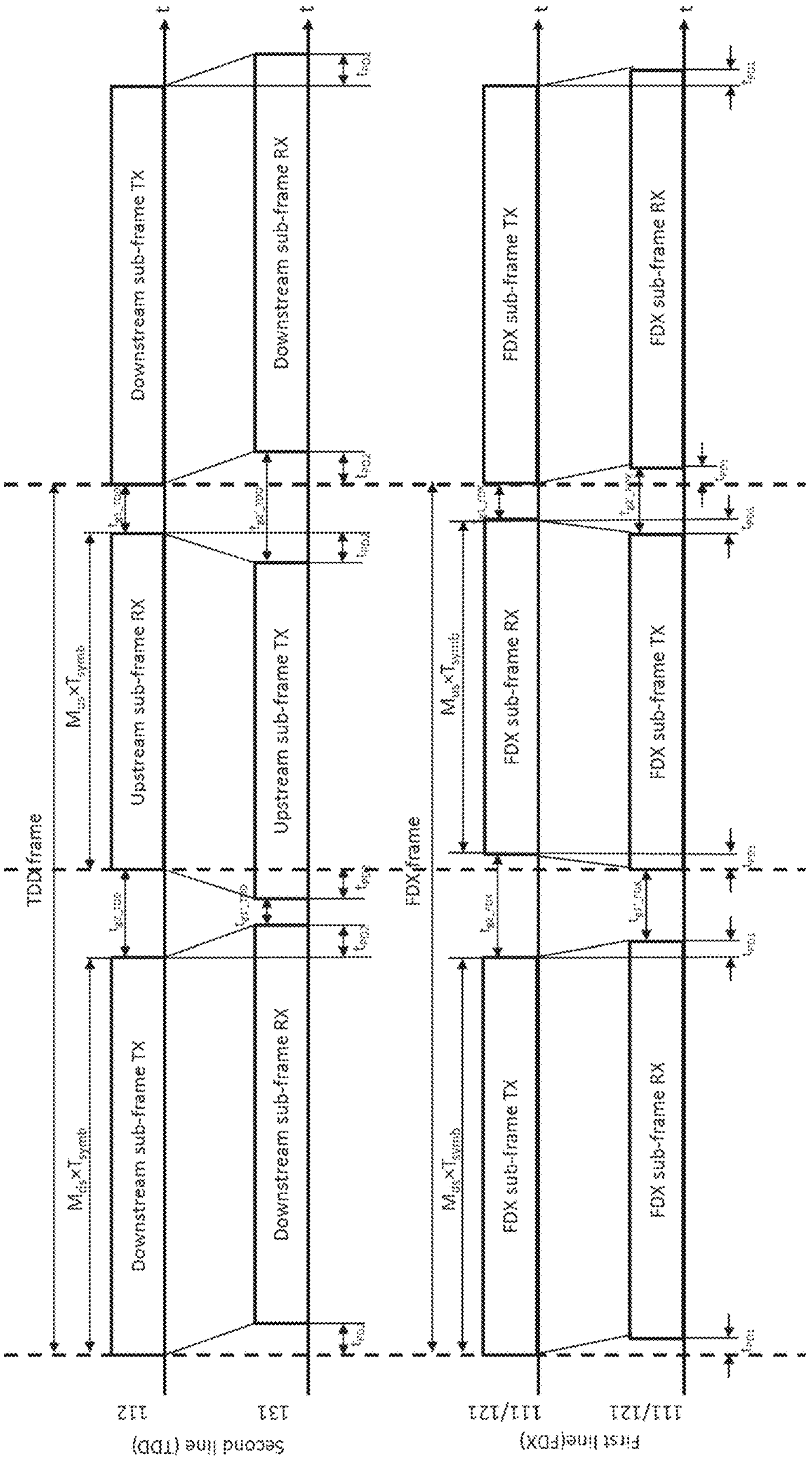
FIG. 3 depicts a schematic timing diagram of another embodiment of the present invention.

FIG. 3 shows a schematic timing diagram of another embodiment of the present invention.

As shown in FIG. 3, a TDD frame transmitted on the second line comprises a downstream sub-frame, an upstream sub-frame and necessary guard time there between.

The communication controller 115 is configured to determine a time gap $t_{g2\_TDD}$ applied at the access node 110 separating an end of a downstream sub-frame transmitted onto the second communication line and a beginning of a subsequent upstream sub-frame received from the second communication line as a predetermined length.

In one embodiment, the predetermined length is determined according to the symbol duration $T_{symb}$ and a time gap $t_{g1\_TDD}$ applied at the access node 110 separating an end of the upstream frame received from the second communication line and a beginning of a subsequent downstream sub-frame transmitted onto the second communication line. Specifically, there is $t_{g2\_TDD}=T_{symb}-t_{g1\_TDD}$.

In FIG. 3, the downstream sub-frame comprises $M_{ds}$ downstream symbols with the second structure, and the upstream sub-frame comprises $M_{us}$ upstream symbols with the second structure. Thereby, the duration of a TDD frame $T_{F\_TDD}$ may be expressed as $T_{F\_TDD}=(M_{ds}+M_{us}+1)\times T_{symb}$.

Then, according to FIG. 3, a time gap $t_{g1'\_TDD}$ applied at the second remote communication unit 131 separating an end of a downstream sub-frame received from the second communication line and a beginning of a subsequent upstream sub-frame transmitted onto the second communication line may be determined as $t_{g1'\_TDD}=t_{g2\_TDD}-2t_{PD2}$. In one embodiment, the time gap $t_{g1'\_TDD}$ may be transmitted to the second remote communication unit 131, so that it may be applied at the second remote communication unit 131.

In the embodiment shown in FIG. 3, FDX coexists with legacy TDD in a communication system, and a FDX frame is set to be of same length as the legacy TDD frame $T_{F\_FDX}=T_{F\_TDD}=(M_{ds}+M_{us}+1)\times T_{symb}$. Specifically, the FDX frame in FIG. 3 comprises a first FDX sub-frame a second FDX sub-frame and necessary guard time there between. The first FDX sub-frame comprises $M_{ds}$ symbols with the first structure, and the second FDX sub-frame comprises $M_{us}$ symbols with the first structure. Thus, the first FDX sub-frame has the same duration as the downstream sub-frame in the second line, and the second FDX sub-frame has the same duration as the upstream sub-frame in the second line.

Specifically, in one embodiment, the first and second FDX sub-frames may correspond to unprioritized FDX transmission.

In another embodiment, the first FDX sub-frame is a downstream priority sub-frame where precedence is given to downstream communications from the access node 110 to the first set of remote communication units 121, 122, and the second FDX sub-frame is an upstream priority sub-frame where precedence is given to upstream communications from the first set of remote communication units 121, 122 to the access node 110, for instance as explained in EP application No 16306744.0 entitled "Method And Apparatus For Full-Duplex Communication over Wired Transmission Media" filed by Alcatel-Lucent on Dec. 20, 2016.

In FIG. 3, the vertical dashed lines represent absolute time aligned across the access node 110, the first remote communication unit 121 and the second remote communication unit 131.

The vertical dashed line on the left represents the starting time of a TDD frame and a FDX frame. As can be seen from FIG. 1, the TDD frame and the FDX frame start at the same time. During the duration of a downstream sub-frame, symbols transmitted onto the first communication line and the second communication line are aligned with respect to their time of transmission.

The vertical dashed line in the middle aligns the time of reception of an upstream sub-frame and the time of transmission of a second FDX sub-frame. As can be seen from FIG. 3, the upstream sub-frame is transmitted before the second FDX sub-frame by an amount of time equal to the second propagation delay $t_{PD2}$. Thus, the upstream sub-frame is received at the same time as the second FDX sub-frame is transmitted.

The vertical dashed line on the right represents the starting time of a subsequent TDD frame and FDX frame.

In order to make sure that the second FDX sub-frame is transmitted at the same time as the upstream sub-frame is received, the communication controller 115 is further configured to determine a time gap $t_{g1'\_FDX}$ applied at the first remote communication unit 121 and the access node 110 separating an end of a first FDX sub-frame received from the first communication line and a beginning of a subsequent second FDX sub-frame transmitted onto the first communication line as $t_{g1'\_FDX}=t_{g2\_TDD}-t_{PD1}$.

The communication controller 115 is further configured to apply the time gap $t_{g1'\_FDX}$ at the first remote communication unit 121 and the access node 110. In one embodiment, the time gap $t_{g1'\_TDD}$ is transmitted to the second remote communication unit 131, so that it may be applied at the second remote communication unit 131.

The invention claimed is:

1. A method of coordinating communications in a communication system, the communication system comprising an access node, communicatively coupled to:

a first set of remote communication units being configured to operate in a full duplex, FDX, mode via respective ones of a first set of communication lines, and a second set of remote communication units being configured to operate in a Time Division Duplex, TDD, mode via respective ones of a second set of communication lines;

wherein symbols transmitted on a first communication line connecting a first remote communication unit belonging to the first set of remote communication units to the access node have a first structure which comprises a first cyclic prefix portion, a data portion and a first cyclic suffix portion, and wherein a cyclic extension comprising the first cyclic prefix portion and the first cyclic suffix portion has a duration ($t_{CE}$);

and symbols transmitted on a second communication line connecting a second remote communication unit belonging to the second set of remote communication units to the access node have a second structure which comprises a second cyclic prefix portion and a data portion, the second cyclic prefix portion having the duration, and the symbol with the first structure and the symbol with the second structure having same symbol duration $T_{symb}$;

the method comprising:

transmitting by the first remote communication unit an upstream symbol with the first structure onto the first communication line at a reference time point $t_{rf}$, wherein the reference time point $t_{rf}$ is determined based on a time of reception of a downstream symbol with the first structure $t_{FDX\_DS\_RX}$ and a first propagation delay over the first communication line $t_{PD1}$, as $t_{rf}=t_{FDX\_DS\_RX}-t_{PD1}$;

transmitting by the second remote communication unit an upstream symbol with the second structure onto the second communication line at $t_{TDD\_US\_TX}=t_{rf}-t_{PD2}$ during a time interval assigned for upstream transmission on the second communication line, wherein $t_{PD2}$ is a second propagation delay over the second communication line.

2. A method according to claim 1, further comprising:

determining the first propagation delay $t_{PD1}$ and the second propagation delay $t_{PD2}$;

sending the first propagation delay $t_{PD1}$ to the first remote communication unit.

3. A method according to claim 1, a FDX frame comprising a first FDX sub-frame and a second FDX sub-frame, the first FDX sub-frame comprising a first number of symbols with the first structure, the second FDX sub-frame comprising a second number of symbols with the first structure; a TDD frame comprising a downstream sub-frame and an upstream sub-frame, the downstream sub-frame comprising the first number of symbols with the second structure, the upstream sub-frame comprising the second number of symbols with the second structure;

wherein the upstream sub-frame is transmitted before the second FDX sub-frame is transmitted by an amount of time equal to the second propagation delay $t_{PD2}$.

4. A method according to claim 3, wherein, the first FDX sub-frame is a downstream priority sub-frame where precedence is given to downstream communications from the access node to the first set of remote communication units, and the second FDX sub-frame is an upstream priority sub-frame where precedence is given to upstream communications from the first set of remote communication units to the access node.

5. A method according to claim 1, further comprising:

determining a time gap $t_{g2\_TDD}$ applied at the access node separating an end of a downstream sub-frame transmitted onto the second communication line and a beginning of a subsequent upstream sub-frame received from the second communication line as a predetermined length;

determining a time gap $t_{g1'\_FDX}$ applied at the first remote communication unit and the access node separating an end of a first FDX sub-frame received from the first communication line and a beginning of a second FDX sub-frame transmitted onto the first communication line as $t_{g1'\_FDX}=t_{g2\_TDD}-t_{PD1}$;

determining a time gap $t_{g1'\_TDD}$ applied at the second remote communication unit separating an end of a downstream sub-frame received from the second communication line and a beginning of a subsequent upstream sub-frame transmitted onto the second communication line as $t_{g1'\_TDD}=t_{g2\_TDD}-2t_{PD2}$;

applying the time gap $t_{g1'\_FDX}$ at the first remote communication unit and the access node, and applying the time gap $t_{g1'\_TDD}$ at the second remote communication unit.

6. A method according to claim 5, wherein the predetermined length is determined according to the symbol duration $T_{symb}$ and a time gap $t_{g1\_TDD}$ applied at the access node separating an end of the upstream frame received from the second communication line and a beginning of a subsequent downstream sub-frame transmitted onto the second communication line as $t_{g2\_TDD}=T_{symb}-t_{g1\_TDD}$.

7. A method according to claim 1, wherein the first communication line and the second communication line are in a same binder.

8. A method according to claim 1, wherein the duration is determined to accommodate a delay spread and a propagation delay of a communication line having a longest supported loop length.

9. A method according to claim 1, further comprising:

controlling the access node to transmit a symbol with the first structure to at least one remote communication unit belonging to the first set of remote communication units at the reference time point $t_{rf}$.

10. A communication system comprising an access node, communicatively coupled to:

a first set of remote communication units being configured to operate in a full duplex, FDX, mode via respective ones of a first set of communication lines, and a second set of remote communication units being configured to operate in a Time Division Duplex, TDD, mode via respective ones of a second set of communication lines;

wherein symbols transmitted on a first communication line connecting a first remote communication unit belonging to the first set of remote communication units to the access node have a first structure and comprises a first cyclic prefix portion, a data portion and a first cyclic suffix portion, and wherein a cyclic extension comprising the first cyclic prefix portion and the first cyclic suffix portion has a duration;

and symbols transmitted on a second communication line connecting a second remote communication unit belonging to the second set of remote communication units to the access node have a second structure and comprises a second cyclic prefix portion and a data portion, the second cyclic prefix portion having the duration, and the symbol with the first structure and the symbol with the second structure having same symbol duration $T_{symb}$;

wherein communications in the communication system are coordinated according to a method of claim 1.

11. A customer Premises Equipment, CPE, wherein communications of the CPE are coordinated according to a method of claim 1.

12. An access node, wherein communications of the access node are coordinated according to a method of claim 1.

13. A communication controller for coordinating communications in a communication system, the communication system comprising an access node, communicatively coupled to:

a first set of remote communication units being configured to operate in a full duplex, FDX, mode via respective ones of a first set of communication lines, and a second set of remote communication units being configured to operate in a Time Division Duplex, TDD, mode via respective ones of a second set of communication lines;

wherein symbols transmitted on a first communication line connecting a first remote communication unit belonging to the first set of remote communication units to the access node have a first structure which comprises a first cyclic prefix portion, a data portion and a first cyclic suffix portion, and wherein a cyclic extension comprising the first cyclic prefix portion and the first cyclic suffix portion has a duration;

and symbols transmitted on a second communication line connecting a second remote communication unit belonging to the second set of remote communication units to the access node have a second structure which comprises a second cyclic prefix portion and a data portion, the second cyclic prefix portion having the duration, and the symbol with the first structure and the symbol with the second structure having same symbol duration $T_{symb}$;

the communication controller being configured:

to control the first remote communication unit to transmit an upstream symbol with the first structure onto the first communication line at a reference time point $t_{rf}$, wherein the reference time point $t_{rf}$ is determined based on a time of reception of a downstream symbol with the first structure $t_{FDX\_DS\_RX}$ and a first propagation delay over the first communication line $t_{PD1}$, as $t_{rf}=t_{FDX\_DS\_RX}-t_{PD1}$;

to control the second remote communication unit to transmit an upstream symbol with the second structure onto the second communication line at $t_{TDD\_US\_TX}=t_{rf}-t_{PD2}$ during a time interval assigned for upstream transmission on the second communication line, wherein $t_{PD2}$ is a second propagation delay over the second communication line.

14. An access node comprising a communication controller according to claim 13.

* * * * *